United States Patent
Kim et al.

(10) Patent No.: US 7,945,644 B2
(45) Date of Patent: May 17, 2011

(54) DYNAMIC INITIALIZATION METHOD AND SYSTEM OF LOCATION SERVER

(75) Inventors: Seong-Hun Kim, Seoul (KR); Gye-Han Song, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 674 days.

(21) Appl. No.: 11/993,196

(22) PCT Filed: Jun. 22, 2006

(86) PCT No.: PCT/KR2006/002409
§ 371 (c)(1),
(2), (4) Date: Dec. 19, 2007

(87) PCT Pub. No.: WO2006/137701
PCT Pub. Date: Dec. 28, 2006

(65) Prior Publication Data
US 2010/0131615 A1    May 27, 2010

(30) Foreign Application Priority Data
Jun. 22, 2005  (KR) .................... 10-2005-0053978

(51) Int. Cl.
*G06F 15/16* (2006.01)
(52) U.S. Cl. ......... 709/219; 709/217; 709/222; 370/390
(58) Field of Classification Search .................. 370/390
See application file for complete search history.

(56) References Cited

U.S. PATENT DOCUMENTS

| | | | |
|---|---|---|---|
| 6,266,781 B1* | 7/2001 | Chung et al. ................... 714/4 |
| 7,483,962 B2* | 1/2009 | Lim et al. ..................... 709/220 |
| 7,822,835 B2* | 10/2010 | Atkinson et al. ............... 709/221 |
| 2004/0078419 A1* | 4/2004 | Ferrari et al. .................. 709/201 |
| 2004/0143654 A1* | 7/2004 | Poirot et al. ................... 709/223 |
| 2006/0282510 A1* | 12/2006 | Preimesberger .............. 709/217 |
| 2007/0058626 A1* | 3/2007 | Keller et al. ................... 370/390 |
| 2008/0002591 A1* | 1/2008 | Ueno ............................. 370/244 |
| 2009/0080427 A1* | 3/2009 | Kamata et al. ................ 370/390 |

FOREIGN PATENT DOCUMENTS

| | | |
|---|---|---|
| JP | 2000-047918 | 2/2000 |
| JP | 2000047918 A * | 2/2000 |
| JP | 2002-132531 | 5/2002 |
| JP | 2002132531 A * | 5/2002 |
| KR | 1020000011835 A | 2/2000 |
| KR | 1020030048503 A | 6/2003 |

* cited by examiner

*Primary Examiner* — Quang N. Nguyen
*Assistant Examiner* — Razu A Miah
(74) *Attorney, Agent, or Firm* — H.C. Park & Associates, PLC

(57) ABSTRACT

A dynamic server initialization system and method includes a second location server requesting a first location server for a registration to a multicast group associated with a replication group, when the second location server is added to the replication group. The replication group comprises at least one location server. The status update messages received from a predetermined service server are transferred to the second location server, when the registration to the multicast group is completed. The second location server requests the first location server for a message dump when a predetermined reference time elapses. Subsequently, the status update messages which are maintained in a predetermined message pool of the first location server are dumped to the second location server according to the message dump request.

19 Claims, 4 Drawing Sheets

DYNAMIC INITIALIZATION METHOD AND SYSTEM OF LOCATION SERVER

CROSS-REFERENCE TO RELATED APPLICATIONS

This application claims priority from PCT Application PCT/KR2006/002409, filed on Jun. 22, 2006, which claims priority from Korean Patent Application No. 10-2005-0053978, filed Jun. 22, 2005. These applications are hereby incorporated by reference herein in their entireties.

BACKGROUND OF THE INVENTION

The present invention relates to a method and system for more dynamically performing an initialization process of a location server which is additionally added to a replication group.

A game server providing a game service generally includes a location server which can integrally manage login/logout information of users. Specifically, when a user accesses a game server via a personal computer (PC) or the Internet, the game server transmits the user's login/logout information to the location server. In this case, the location server manages users' login/logout information which are received from a plurality of game servers. Accordingly, even in the case of the user who has accessed another game server, the location server may provide information about a game server which a particular user has accessed.

However, in the case of an online game which simultaneously provides a game service to a large number of users, hundreds of game servers provide the game service. Accordingly, when a single location server manages the login/logout information, system load of the location server is extremely increased. Thus, a method of constructing a plurality of location servers as a replication group is suggested to alleviate the system load of the location server. In this instance, the plurality of location servers of the replication group need to have identical information about each user's login/logout status. Even when an additional location server is added to the replication group, the additional location server needs to have the identical information as that of other location servers. Accordingly, when the additional location server joins in the replication group, an initialization process of dumping (duplicating) messages, which are maintained in an existing location server of the replication group, to the additional location server is performed.

However, some messages received from a game server may not be stored in the location server while the location server is initialized if the message is received after the dumping process has started Namely, the received message may be omitted or lost.

Accordingly, a sophisticated initialization model with respect to a location server of a replication group where a message received from a game server is neither omitted nor lost, regardless of a dumping process, is required.

SUMMARY OF THE INVENTION

A method and system is provided for dynamically initializing a location server, which enables optimal dumping of a message, so that a status update message received from a game server is not omitted during an initialization process, when adding an additional location server to a replication group. The method and system can support a stable message dump in an initialization process of the location server by allowing the message dump with respect to only the location server which can normally receive a message. In addition, the method and system can optimize a message pool of a location server by removing an unnecessarily duplicated status update message.

According to an aspect of the present invention, there is provided a method of initializing a location server. The method includes a second location server requesting a first location server for a registration to a multicast group associated with a replication group, when the second location server is added to the replication group comprising at least one first location server, and transferring status update messages which are received from a predetermined service server, to the second location server, when the registration is completed in the first location server. The second location server requests the first location server for a message dump when a predetermined reference time elapses. The method further includes dumping the status update messages which are maintained in a predetermined message pool of the first location server, to the second location server according to the message dump request.

According to another aspect of the present invention, there is provided a system for initializing a location server. The system include s a multicast request generation unit for requesting a first location server for a registration to a multicast group associated with a replication group in a second location server, when the second location server is added to the replication group comprising at least one first location server, a multicast processing unit for transferring status update messages which are received from a predetermined service server, to the second location server, when the registration is completed in the first location server a dump request unit for requesting the first location server for a message dump and a dump processing unit for dumping the status update message which is stored in a message pool of the first location server, to the second location server, according to the message dump request.

DETAILED DESCRIPTION

Figure 1:
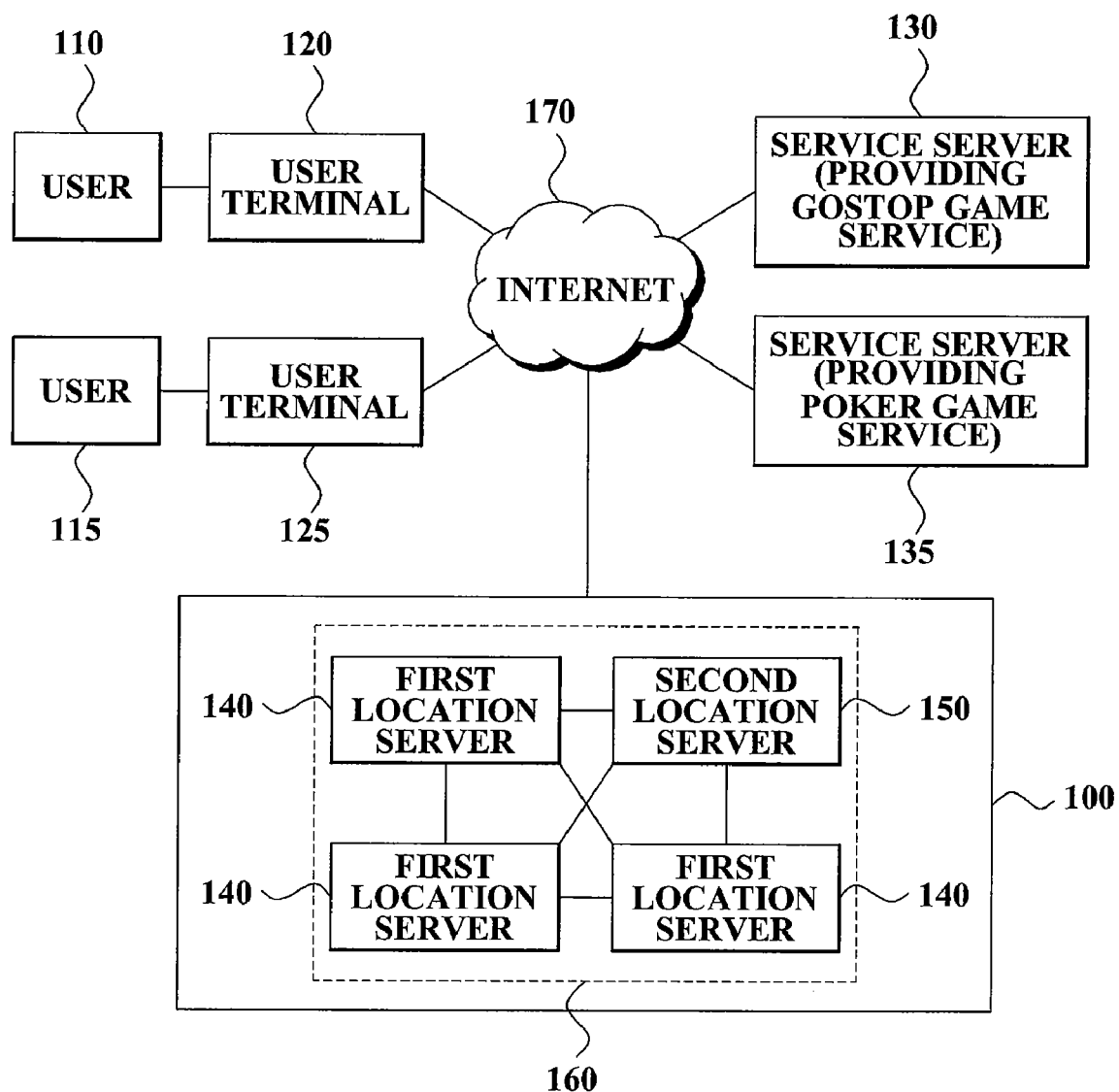
FIG. 1 is a diagram illustrating a network connection of a user terminal, a service server, and a plurality of location servers, which form a replication group, according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

As used herein, a "location server" refers to a server or system that is utilized for integrally managing "status update messages" which are independently managed in a plurality of service servers, thereby generating information about a current user access status or information to identify a location of a service server where a particular user is connected, and providing a corresponding user with the generated information. A "status update message," as used herein, refers to user information including user login or logout information which used to be processed in a conventional individual service server. The location server functions to receive status update messages from various service servers. In addition, a user can obtain from the location server information about a service server where a particular user is connected. In this manner, the location server may be used to prevent a single user from double logging into a plurality of service servers at the same time.

In an aspect of an embodiment, the location server may be replicated into a plurality of location servers and installed to form a replication group. In addition, the location server enables the plurality of location servers of the replication group to operate as a single location server by synchronizing a status of each of the plurality of location servers of the replication group. In another aspect of embodiments, a method of integrally managing status update messages which are received from several service servers by using a plurality of location servers is adopted. When processing status update messages received from a large number of service servers, it is possible to distribute system loads among the location servers, which can optimize a message processing.

The plurality of location servers is included in a "replication group" so as to process a signal of the status update message via the replication group. Generally, the replication group receives a status update message, e.g., a login message or a logout message, which is generated from the service server. Further, the replication group use the user's login message or logout message to generates location information of a service server accessed by a user, or information about whether the user has logged into a plurality of service servers at the same time. The replication group transmits the generated information to the service server.

When the replication group includes a plurality of location servers, each location server generally needs to maintain identical status update messages. Accordingly, a multicast for transferring the status update messages maintained in each of the plurality of location servers to other location servers would need to be performed among the location servers in the replication group. In one embodiment, the multicast may be performed among the location servers which is registered to an identical multicast group. For example, a location server which receives an additional status update message from the service server may transmit the received additional update message to all the location servers which are registered to the identical multicast group.

FIG. 1 is a diagram illustrating a network connection of a user terminal, a service server, and a plurality of location servers, which are constructed into a replication group, according to an exemplary embodiment of the present invention.

When an additional location server is added to a replication group 160, a dynamic server initialization system 100 enables the additional location server to obtain an identical status as other location servers of the replication group 160. Specifically, the dynamic server initialization system 100 optimally registers the additional location server to a multicast group and performs a message dump so that status update messages which are maintained in the existing location servers may be maintained in the additional location server without any omission.

In one embodiment, a user 110 or 115 uses a user terminal 120 or 125 to access any of the service servers 130 and 135 via a network 170. For the purpose of discussion, it is assumed that the service servers 130 and 135 provide game services that the user 110 or 115 desires to play. For example, when the user 110 or 115 desires to play an online GOSTOP game, the user 110 or 115 may access a GOSTOP service server 130 which provides a GOSTOP game service. When the user 110 or 115 desires to play an online poker game, the user 110 or 115 may access a poker service server 135 which provides a poker game service.

It is further assumed that the user 110 currently accesses the service server 135 while the user 115 does not currently access the service server 135. The user 115 accesses the service server 130. When the user 110 desires to identify a location of another user 115 who has not accessed the identical service server 135, the corresponding user terminal 120 may transfer request information for identifying the service server 130 that the user 115 accesses, to the service server 130. In response to the request information, the service server 135 may transfer a request for providing the information about the user 115 to location servers 140 and 150.

As briefly described above, the location servers 140 and 150 are configured to receive status update information about login or logout status of the users 110 and 115 who have accessed the servers 130 and 135, from all the service servers 130 and 135, and to integrally manage the received status update information. For example, in response to the request for providing information associated with location identification, the location servers 140 and 150 may identify the service server 130 or 135 where the particular user 115 is currently connected, and provide the identified service server information (location information) for another user 110 who has requested the location identification.

As the users 110 and 115 access the service servers 130 and 135, the location servers 140 and 150 receive the user's 115 login/logout information from the service servers 130 and 135, and store the received login/logout information in a message pool which is allocated for each of the service servers 130 and 135. Accordingly, the location servers 140 and 150 may accumulate, in the message pools, login/logout information about the users 110 and 115 who access the service servers 130 and 135, and manage the accumulated login/logout information. Also, the location servers 140 and 150 may accurately identify a location associated with user information and service server information. As will be described in detail below, the location information may provide various information about the service server 130 or 135, for example, the service server where the user 110 or 115 has most recently logged in or logged out.

In an embodiment, the plurality of location servers 140 and 150 are provided as the replication group 160. In the embodiment, each location server 140 and 150 maintains the identical status update messages. In this manner, the replication group 160 operates as if a single location server operates. Specifically, the replication group 160 may improve processing capability of the status update messages by utilizing a number of the location servers 140 and 150. The replication group 160 may optimally distribute system loads over the location servers to handle massive amounts of logins/logouts in the service servers 130 and 135. In addition, the replication group 160 enables each of the location servers 140 and 150 to maintain the identical status update messages. Accordingly, any location server 140 and 150 in the replication group can perform a regular message processing.

In one embodiment, the replication group 160 enables the status update messages to be continuously exchanged among the location servers 140 and 150 so that the location servers 140 and 150 can maintain the identical status update messages. As will be discussed in greater detail below, a multicast is utilized in the process of exchanging the status update messages among the location servers 140 and 150. The multicast may be performed among the location servers 140 and 150 which are listed in a "multicast list." The multicast list includes a list of location servers where a particular location server forwards newly received messages. In one embodiment, the multicast list is allocated to each of the location servers 140 and 150. For example, when a particular location server receives an additional message, the location server may transmit the received additional message to other location servers which are listed in the multicast list of the particular location server.

In one embodiment, the multicast list includes location servers which joined in the multicast group. For example, the location servers 140 and 150 which are included in the identical replication group 160 may be automatically registered to the multicast group. When any of the location servers 140 and 150 receives an additional status update message, the received additional status update message may be transmitted to other remaining location servers 140 and 150 in the multicast group, using a multicast method.

Likewise, the location servers 140 and 150 may join in an "anycast group" which allows the location servers 140 and 150 to directly receive status update messages from the service servers 130 and 135. Specifically, the location servers 140 and 150 which have joined in the anycast group may exclusively receive the status update messages which are generated from the service servers 130 and 135. In other words, the location servers 140 and 150 which have not joined in the anycast group pass through other location servers 140 and 150 via the multicast method to receive the status update messages from the service servers 130 and 135.

It is to be noted that a condition for joining in the anycast group may be limited. For example, only the location servers 140 and 150 which maintain the status update messages that have been maintained in most of location servers 140 and 150 of the replication group 160 may be permitted to be registered to the anycast group. The status update messages which the location servers 140 and 150 of the anycast group 160 receive may be transferred (multicast) to all the location servers 140 and 150 of the replication group 160 including the corresponding location server, i.e., all the location servers 140 and 150 of the multicast group where the corresponding location server has registered.

Hereinafter, an example of transferring the status update messages which are received from the service servers 130 and 135 to the location servers 140 and 150 will be described.

For the sake of discussion, assume that the service servers 130 and 135 provide game services that the users 110 and 115 desire to play. When the users 110 and 115 access the service servers 130 and 135 via the user terminals 120 and 125, and the network 170, the service servers 130 and 135 transmit a login message or a logout message (status update message) to any one of the location servers 140 and 150 in the replication group 160. The location servers 140 and 150 which directly receive the status update messages from the service server 130 and 135 may be limited to the location servers 140 and 150 which have joined in the anycast group.

In one embodiment, each of the status update messages may include the information about users currently access service servers. The information about each user may include, but not limited to, a user identifier, login/logout status, and location information of the user. The user identifier is utilized for identifying the user 110 or 115. For instance, the user identifier that the user 110 or 115 has utilized when performing a login/logout to/from any one of the service servers 130 and 135 may be utilized. The login/logout status may be information about whether the user 110 or 115 has logged in to or logged out from any one of the service servers 130 and 135. Alternatively, the location information may be information about any one of the service servers 130 and 135 where the user 110 or 115 has logged in or logged out. The location information may be an identifier, for example, "GOSTOP", "poker", and "hula", of the service server 130 or 135 where the user 110 or 115 has logged in/logged out. In one embodiment, the location information may provide information about the service server 130 or 135 where the user 110 or 115 has most recently logged in or logged out.

Any one of the location servers 140 and 150 which received the status update message may transmit the received status update message to other location servers 140 and 150 which belong to the replication group 160 and also joined in the multicast group. In this case, the corresponding location server which transmits the status update message may transmit the received status update message using a multicast method.

As shown in FIG. 1, the dynamic server initialization system 100 determines a rebooting location server among location servers of the replication group 160 or a location server, which is additionally registered to the replication group 160, as the second location server 150 which additionally joins in the replication group 160, and initializes the second location server 150. As will be appreciated, initializing the second location server 150 may designate a process of rebooting or ensuring the additionally registering location server to be in a run state. Namely, the dynamic server initialization system 100 may initialize the second location server 150 through a process of dumping all the status update messages that are maintained in existing location servers (hereinafter, first location server) of the replication group 160 and enable the second location server 150 so that the second location server can directly receive status update messages from the service servers 130 and 135 via a registration to the anycast group.

Figure 2:
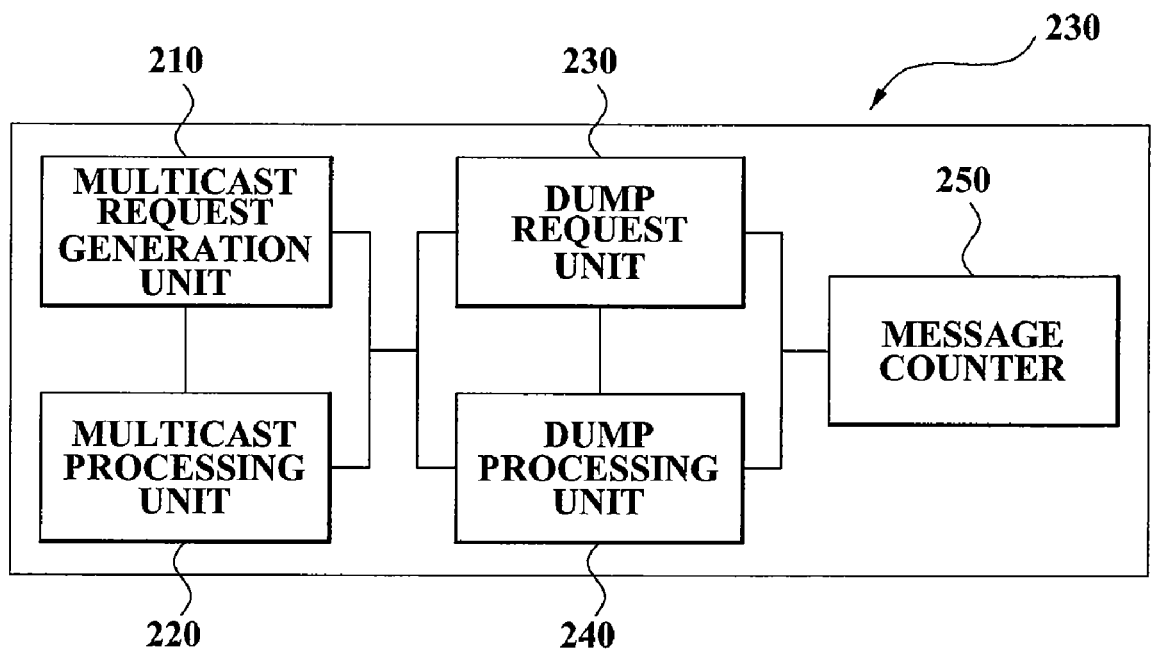
FIG. 2 is a configuration diagram illustrating a dynamic server initialization system according to an exemplary embodiment of the present invention.

With reference to FIG. 2, a configuration of a dynamic server initialization system 200 according to an embodiment of the present invention will be described.

The dynamic server initialization system 200 includes a multicast request generation unit 210, a multicast processing unit 220, a dump request unit 230, and a dump processing unit 240. As briefly described above, the second location server refers to a location server which is newly added to the replication group and the first location server refers to a location server which is an existing location server in the replication group.

When dynamic server initialization system 200 detects that the second location server 150 is added to the replication group 160, the multicast request generation unit 210 requests the first location server 140 for a registration to a multicast group associated with the replication group 160. In this instance, the replication group 160 includes at least one first location server 140. A first location server 140 may be an existing location server which has joined in the multicast group. The first location server 140 transfers status update messages which are stored in its message pool, to other location servers of the replication group 160. In addition, the first location server 140 may be an existing location server which has joined in the anycast group and also transmit the status update messages which are directly received from the service server 130 and 135, to the other first location servers 140 and the second location server 150 of the replication group 160. The second location server 150 may be a newly added location server to be registered with the replication group 160 or a location server, which is being rebooted after a temporary interruption due to a system error, among location servers of the replication group 160.

When an initialization process is required for a second location server, the multicast request generation unit 210 controls a multicast registration request to be transmitted from the second location server 150 to the first location servers 140. The multicast registration request relates to joining the second location server 150 in the multicast group. As discussed above, each of the first location servers 140 in the replication group 160 stores the transferred status update messages in a storage space, such as a message pool, until the multicast registration request is generated.

The multicast processing unit 220 transfers the status update messages which are received from the service servers 130 and 135, to the second location server 150, when the registration of the second location server 150 to the multicast group is completed in the first location server 140. The registration to the multicast group may designate registering a network address of the second location server 150 to a multicast list. In one embodiment, the multicast list is allocated for each of the first location servers 140. Specifically, the multicast processing unit 220 joins the second location server 150 in the multicast group including the first location servers 140, and transmits the status update messages which are received from the service servers 130 and 135 to the second location server 150 via the first location servers 140. In this case, the network address of the second location server 150 has been registered to the multicast list.

In some instances, right after the registration to the multicast group, the second location server 150 has not yet joined in the anycast group. In such instances, the second location server 150 does not directly receive the status update messages from the service servers 130 and 135. The reason the second location group 150 has not yet join in the anycast group is because the status update messages maintained in the second location server 150 are limited to the status update messages which are received from the service servers 130 and 135 after the second location server 150 is registered to the multicast group and therefore, the second location server 150 is not in a run state where the second location server 150 is able self-process the status update messages. Specifically, the second location server 150 receives the status update messages from the service servers 130 and 135 via the first location servers 140 which are already joined in the anycast group, and stores the received status update messages in the message pool of the second location server 150.

The dump request unit 230 controls the second location server 150 to request the first location server 140 for a message dump as a reference time elapses. The reference time may be, for example, a time which is spent for determining whether the second location server 150 which has joined in the multicast group may normally receive the status update message. In addition, the reference time may be arbitrarily set as an optimal time by an operator of the present system, based on the operator's experience. For example, 10 seconds after a registration completion point in time may be set as the reference time.

After the second location server 150 is registered to the multicast group the dump request unit 230 receives the status update messages from the second location server 150 during the reference time. In one embodiment, the dump request unit 230 verifies a status of the second location server 150 to join in the replication group 160, and requests only a prepared second location server 150 for the message dump. When the second location server 150 does not receive the status update message which is transferred within the reference time, the dump request unit 230 notifies the operator (not shown) of the dynamic server initialization system 200 so that an appropriate action, such as changing of the second location server 150, may be performed.

In another embodiment of the present invention, a reference number of times that the status update messages are received, instead of the reference time, is used for the message dump process. In this embodiment, the dynamic server initialization system 200 may further include a message counter 250. The message counter 250 counts the number of status update messages that are transferred from the first location server 140 to the second location server 150, after the registration of the second location server 150 to the multicast group is completed.

When the number of times the status update messages are transferred, counted by the message counter 250, reaches the reference number of times, the dump request unit 230 may control the second location server 150 to request the first location server 140 for the message dump. The reference number of times may be the number of times that the status update messages are received. The reference number of times may be used to determine whether the second location server 150 is prepared, when a predetermined number of status update messages is normally received from the second location server 150 of the multicast group. Alternatively, the number of times may be set as the number of times that the operator determines as optimal, based on the operator's experience. For example, 5 times after the registration completion point in time may be set as the reference number of times.

The dump request unit 230 determines that the second location server 150 is prepared for the message dump process if the second location server 150 has received the status update messages as many times as the reference number of times, for example, 5 times after the second location server 150 is registered to the multicast group. Upon determination, the dump request unit 230 may request the first location server 140 for the message dump. With respect to the second location server 150 which does not receive the status update messages as many times as the reference number of times, the dump request unit 230 may transmit a server error message to the operator of the present system.

The dump processing unit 240 dumps the status update messages which are stored in a message pool of the first location servers 140, to the second location server 150, according to the message dump request. Specifically, the dump processing unit 240 dumps (duplicates) all status update messages which are maintained in the first location server 140, to the second location server 150 which is determined as prepared, so that the first location server 140 and the second location server may maintain identical status update messages. Specifically, the dump processing unit 240 functions to join the second location server 150 in the replication group 160 including at least one first location server 140, thereby completing a process of initializing the second location server 150.

In one embodiment, the dump processing unit 240 uses a time stamp to select the status update message to be dumped to the second location server 150 from the status update messages which are maintained in the message pool of the first location server 140. In this embodiment, the time stamp is included in each of the status update messages. The time stamp is generated in association with a time when each of the status update messages is received from the service server 130 or 135. The generated time stamp may be stored in the message pool in correspondence to the status update message. Specifically, the dump processing unit 240 may select the status update message which the first location server 140 received at a particular time, as a duplicate status update message, based on the time stamp.

For example, the dump processing unit 240 may exclude a corresponding status update message from a dump target, when the status update message is transferred from the first location server 140 at a point in time when the message dump is requested. Specifically, when the message dump is requested while transferring the status update message from the first location server 140 via a multicast method, the dump processing unit 240 may determine, as the dump target, a status update message of a time stamp prior to the point in time when the message dump is requested, from the status update messages stored in the message pool of the first location server 140, and dump the determined status update message to the second location server 150.

When the status update message is not transferred from the first location server 140 at the point in time when the message dump is requested or even when the status update message is transferred to the second location server 150, the dump processing unit 240 may dump all the status update messages stored in the message pool of the first location server 140, to the second location server 150.

According to an aspect of an embodiment, a message dump is allowed to only a location server which can stably receive a message. Accordingly, it is possible to support a sophisticated initialization process without omitting the status update message when initializing a location server.

Also, the dump processing unit 240 may delete a duplicate state update message from the status update messages stored in the message pool, after completing the dumping of the status update messages to the second locations server 150. The message pool of the second location server 150 maintains status update messages which are received from the service servers 130 and 135 via the first location server 140 after the second location server 150 is registered to the multicast group. After the message dump request, the status update messages are dumped from the first locations server 140, and are stored in the message pool of the second location server 150. As a result, an identical, duplicate status update message may be stored in the message pool of the second location server 150. The dump processing unit 240 identifies the duplicate status update message so that only a single status update message may be maintained in the message pool. Specifically, after the registration to the multicast group is completed, the dump processing unit 240 identifies the status update messages that the second location server 150 receives from the service servers 130 and 135, as the duplicate status update messages, and deletes the same from the message pool of the second location server 150.

As will be well appreciated, it is possible to optimally maintain the message pool of the second location server 150 by deleting an unnecessary, duplicate status update message.

As described above, the dynamic server initialization system 200 supports an initialization process with respect to an additional location server which joins in the replication group 160, via a predetermined process such as a registration to a multicast group, a standby of receiving a message when a predetermined reference time elapses or receiving as many times as a reference number of times, or a message dump. Thus, it is possible to stably store the status update messages which the second location server 150 receives via a multicast method during the message dump, in the message pool of the second location server 150.

With respect to the second location server 150 where the message dump is completed, the dynamic server initialization system 200 requests the service servers 130 and 135 to register the second location server to the anycast group. Once the registration to the anycast group is completed in the service servers 130 and 135, the dynamic server initialization system 200 allows the second location server 150 to directly receive the status update messages from the service servers 130 and 135. Accordingly, the second location server 150 enters a "run state" where the second location server 150 can self-process the status update messages. As will be discussed in greater detail below, in the run state, the second location server 150 may transfer the status update messages, which are directly received from the service servers 130 and 135, to the first location server 140 of the identical multicast group.

Figure 3:
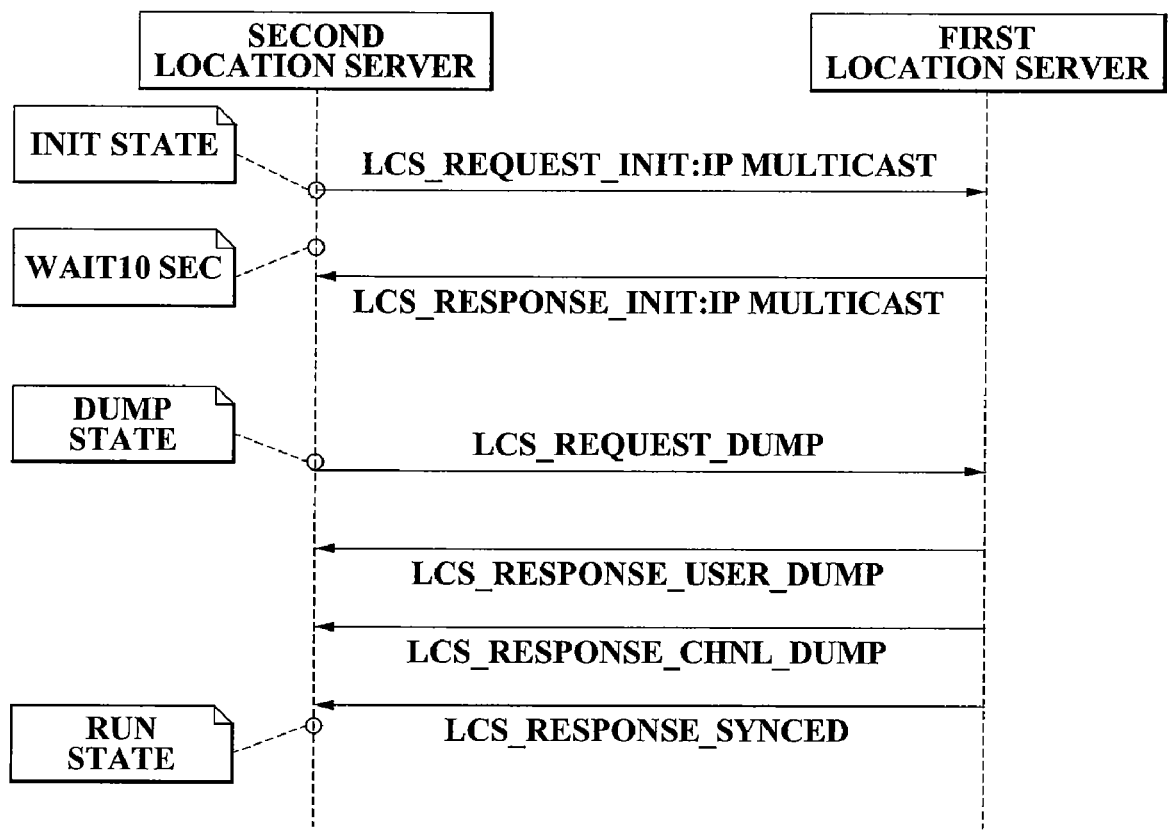
FIG. 3 is a diagram illustrating an example of exchanging a message between a first location server and a second location server according to an exemplary embodiment of the present invention.

FIG. 3 is a diagram illustrating an example of exchanging a message between a first location server and a second location server according to an exemplary embodiment of the present invention.

In FIG. 3, a state of the second location server is divided into an 'init state', a 'dump state', and a 'run state', for convenience of description.

In the 'init state', the second location server transmits a request signal, 'LCS_REQUEST_INIT', to the first location server. The request signal 'LCS_REQUEST_INIT' is associated with a registration to a multicast group. The request signal 'LCS_REQUEST_INIT' is a multicast registration request signal(IP multicast) for verifying the first location server of the run state from the first location servers which are included in a replication group.

The first location server which receives the 'LCS_REQUEST_INIT', transmits a response signal 'LCS_RESPONSE_INIT' to the second location server. The response signal 'LCS_RESPONSE_INIT' allows the second location server to be registered to the multicast group. Specifically, the first location server registers the second location server to the multicast group, generates the 'LCS_RESPONSE_UNIT', and transmits the generated response signal 'LCS_RESPONSE_INIT' to the second location server so that status update messages which are directly received from a service server may be transferred to the second location server. In this case, the response signal 'LCS_RESPONSE_INIT' may include an Internet Protocol (IP) or a Transmission Control Protocol (TCP) port address as a network address (IP multicast) of the first location server. Accordingly, the second location server may join in the multicast group including the at least one first location server, and also may receive the status update messages via the first location server.

Upon the registration to the multicast group, the second location server receives the status update messages via a multicast method during a predetermined reference time, for example, 10 seconds. As described above, the reference time is required for determining whether the second location server is prepared. In the 'dump state', the second location server transmits a request signal 'LCS_REQUEST_DUMP' associated with a message dump, to the first location server. The request signal 'LCS_REQUEST_DUMP' requests the first location server, which is in the run state, for the message dump with respect to the status update messages stored in the message pool and a channel which dumps the status update messages. The request signal 'LCS_REQUEST_DUMP' may be controlled to be generated in the second location server which is determined to normally receive the status update messages which are received during the reference time.

In one embodiment, the first location server, which receives the request signal 'LCS_REQUEST_DUMP', may continuously transmit three response signals to the second location server 150 in association with the message dump. In this embodiment, the three response signals include 'LCS_RESPONSE_USER_DUMP', 'LCS_RESPONSE_CHNL_

DUMP', and 'LCS_RESPONSE_SYNCED', as shown in FIG. 3. The response signal 'LCS_RESPONSE_USER_DUMP' is associated with starting the message dump of the status update messages in response to the request signal 'LCS_REQUEST_DUMP'. Likewise, the response signal 'LCS_RESPONSE_CHNL_DUMP' is associated with status information of the channel where the status update messages are dumped in response to the request signal 'LCS_REQUEST_DUMP'. The response signal 'LCS_RESPONSE_SYNCED' announces that the message dump from the first location server is completed, in response to the request signal 'LCS_REQUEST_DUMP'.

The first location server 140, which receives the request signal 'LCS_REQUEST_DUMP', transmits the status information about a start and a termination of the message dump to the second location server. Whereupon complete ion of the message dump, the second location server enters the run state which is a current state of the first location server. In the 'run state,' the second location server may self-process the status update messages.

In addition, the second location server is qualified to register to the anycast group. After the registration to the anycast group is completed, the second location server may directly receive the status update messages from the service server, and transfer the received status update messages to the first location server via a multicast method.

Hereinafter, an operation flow of the dynamic server initialization system 200 according to an exemplary embodiment of the present invention will be described in detail.

Figure 4:
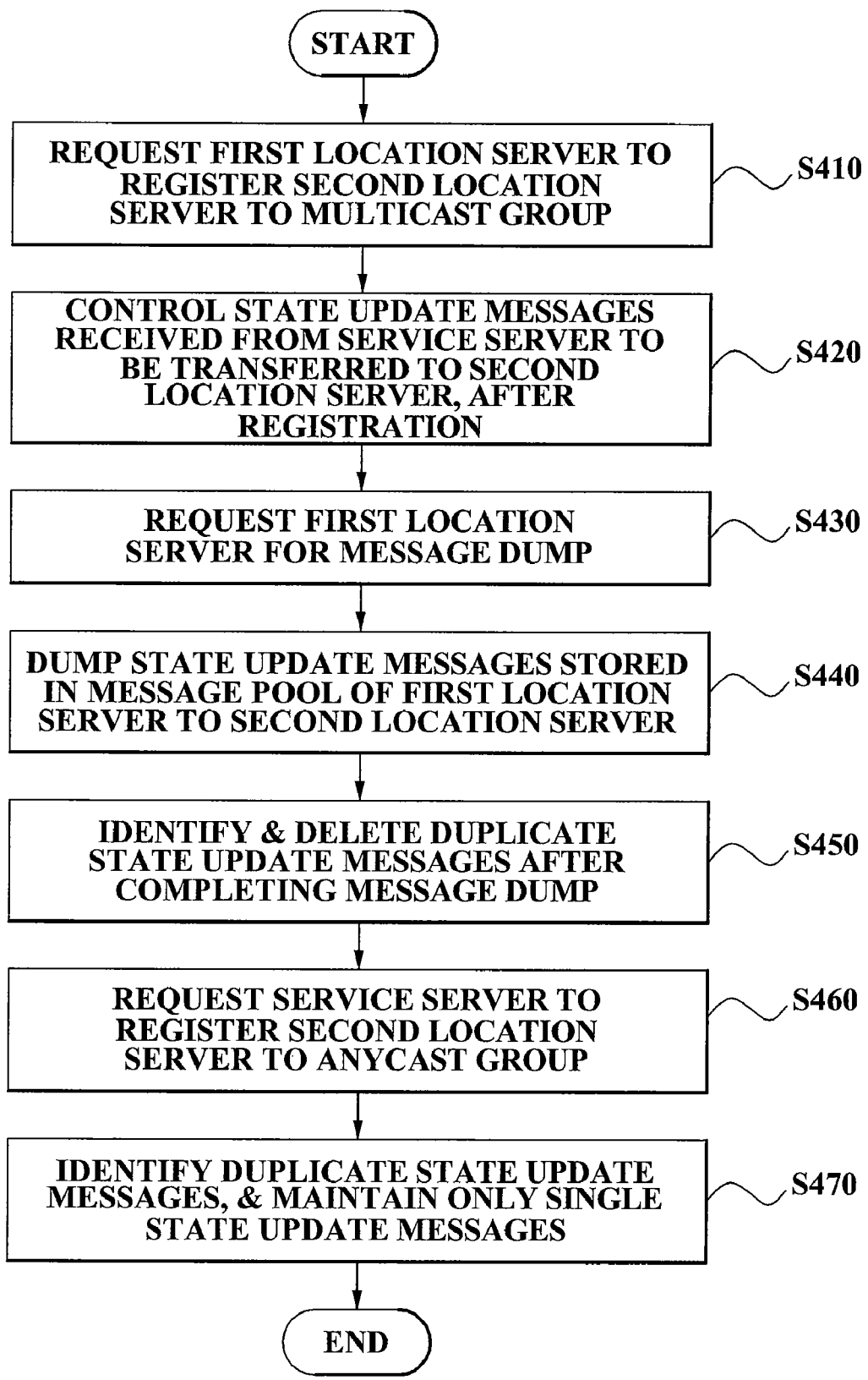
FIG. 4 is a flowchart illustrating a dynamic server initialization method according to an exemplary embodiment of the present invention.

FIG. 4 is a flowchart 400 illustrating a dynamic server initialization method according to an exemplary embodiment of the present invention. As will be appreciated, the dynamic server initialization method as illustrated in FIG. 4 may be performed by the aforementioned dynamic server initialization system 200.

In operation S410, the dynamic server initialization system 200 requests the first location server 140 to register the second location server to a multicast group associated with the replication group 160, when the second location server 150 is added to the replication group 160 including at least one first location server 140. The present operation S410 is a process of determining a location server, which is being rebooted after a temporary interruption due to a system error, as the second location server 150, and requesting the first location server 140 to register the second location server 150 to the multicast group. When an additional location server is included in the replication group 160, the dynamic server initialization system 200 may determine the additional location server as the second location server 150.

In operation S410, as a rebooting signal or an additional server signal occurs in the replication group 160, the dynamic server initialization system 200 transmits the registration request for joining the second location server 150 in the multicast group of the first location server 150, from the second location server 150 to the first location server 140.

In operation S420, the dynamic server initialization system 200 controls status update messages which are received from the service servers 130 and 135, to be transferred to the second location server 150 after the registration is completed in the first location server 140. The present operation S420 is a process of transferring the state update messages to the second location server 150 which is registered to the multicast group. In an embodiment, the first location server 140 has been already registered to the anycast group. The present operation S420 is a process of receiving the status update messages from the service servers 130 and 135 via the first location server 140. The first location server 140 may directly receive the status update messages from the service servers 130 and 135, and transfer the received status update messages to the second location server 150.

In operation S430, the dynamic server initialization system 200 requests the first location server 140 for a message dump to the second location server 150, when a predetermined reference time elapses. The present operation S430 is a process of identifying a point in time when the message dump was requested. In operation S430, it is verified whether the second location server 150 receives the status update messages during the reference time, and when the second location server 150 is determined as prepared for the message dump, the dynamic server initialization system 200 enables the request of the message dump in the first location server. Specifically, the dynamic server initialization system 200 transmits a corresponding request signal from the second location server 150 to the first location server 140, so that the status update messages which are received from the service servers 130 and 135 before the second location server 150 joining in the replication group 160 (state update messages which are maintained in the first location server 140) may be duplicated to the second location server 150.

In operation S430, the dynamic server initialization system 200 may identify the point in time when the message dump was requested, even when using a reference number of times, not the reference time. Specifically, as the second location server 150, which is registered to the multicast group, normally receives the status update messages as many times as the reference number of times, the dynamic server initialization system 200 determines that the second location server 150 is prepared, and requests the first location server 140 for the message dump. The detailed description related thereto has been described above, and thus, will be omitted.

In operation S440, the dynamic server initialization system 200 dumps the status update messages which are maintained in a message pool of the first location server 140, to the second location server 150 according to the message dump request. The present operation S440 is a process of ensuring the status of the second location server 150 of the replication group 160 identical to the status of the first location server 140, i.e. a process of ensuring the status update messages maintained in each of the message pools to be identical.

Particularly, in operation S440, while the message dump is being performed, the dynamic server initialization system 200 may determine whether the status update messages are simultaneously transferred from the first location server 140 via a multicast method, and as a result of the determination, may selectively dump the status update messages stored in the first location server 140. For this, each of the status update messages includes a time stamp associated with a time when each of the status update messages is received. Accordingly, the dynamic server initialization system 200 may determine remaining status update messages, excluding a most recently stored status update message, i.e., a currently transferring status update message via the multicast method, from the message pool of the first location server 140, and dump the determined remaining status update messages to the second location server 150.

Also, in operation S440, the dynamic server initialization system 200 may dump all the status update messages stored in the message pool of the first location server 140, to the second location server 150 at a point in time when the message dump is completed.

In operation S450, after the dumping of the status update messages is completed in the second location server 150, the dynamic server initialization system 200 identifies a duplicate status update message which is stored in the message pool of the second location server 150, and controls only a single update message to be maintained in the message pool. The duplicate status update message is generated because a transferred status update message, transferred via the multicast method after the second location server 150 is registered to the multicast group, is also maintained in the first location server 140. Specifically, the status update messages which the second location server 150 has received via the multicast method may be included in the state update messages which are dumped from the first location server 140. Accordingly, in operation S450, the dynamic server initialization system 200 may remove the status update messages which are received from the service servers 130 and 135 after completing the registration to the multicast group.

In operation S460, the dynamic server initialization system 200 requests the service servers 130 and 135 to register the second location server 150 to the anycast group. The present operation S460 is a process of transmitting a registration request to the service servers 130 and 135, so that the second location server 150 may directly receive the status update messages from the service servers 130 and 135.

In operation S470, the dynamic server initialization system 200 transfers the status update messages which are directly received from the service servers 130 and 135 to the first location server 140 of the multicast group, after the registration of the second location server 150 to the anycast group is completed in the service servers 130 and 135. The present operation S470 is a process of maintaining the second location server 150 in the run state, directly receiving the status update messages from the service servers 130 and 135, and transferring the received status update messages to other location servers via the multicast method.

It is to be noted that it is possible to secure an optimal message dump without omitting a status update message received from a service server during an initialization process, when an additional location server is added in a replication group.

As will be well appreciated, the dynamic server initialization method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

According to an aspect of the present invention, there is provided a method and system for dynamically initializing a location server, which enables optimal dumping of a message, so that a status update message received from a game server is not omitted during an initialization process, when adding an additional location server to a replication group.

According to another aspect of the present invention, there is provided a method and system for dynamically initializing a location server, which can support a stable message dump in an initialization process of the location server by allowing the message dump with respect to only the location server which can normally receive a message.

According to yet another aspect of the present invention, there is provided a method and system for dynamically initializing a location server, which can optimize a message pool of a location server by removing an unnecessarily duplicated status update message.

The invention claimed is:

1. A method of initializing a server for a replication group comprising a plurality of servers configured to communicate using a multicast, the method comprising:
   receiving a request of initializing a location server to register the requested location server to one of multicast servers of a replicated multicast group, wherein a plurality of multicast servers are replicated in a network;
   transferring a set of status update messages associated with one of the multicast servers to the requested location server in response to detection of a completion of a registration by one of the multicast servers, wherein the set of status update messages are transmitted from a service server to one of the multicast servers using an anycast;
   requesting the requested location server for receiving dumping message; and
   dumping, in responding to the request, the set of status update messages of one of the multicast servers to the requested location server, wherein said dumping comprises determining whether a firstly requested location server has received each status update message at a time when the dumping message is requested, and dumping another set of status update messages to the secondly requested location server, wherein the another set of status update messages is determined based on a time stamp of each status update message and the time stamp is determined when the firstly requested location server transfers set of status update messages.

2. The method of claim 1, wherein one of the plurality of the multicast servers comprises a message pool which stores the status update messages received from the service server and at least a portion of the status update messages stored in the message pool is dumped to the requested location server.

3. The method of claim 2, wherein each status update messages comprises a time stamp associated with a time in response to receipt of each of the status update messages from the service server.

4. The method of claim 2, wherein all of the status update messages stored in the message pool of the requested location server are dumped to the another location server before the message dump is requested.

5. The method of claim 1, wherein the requested location server removes duplicated status update messages subsequent to the complete dumping of the status update messages.

6. The method of claim 5, wherein the requested location server removes status update messages received from the service server as the duplicated status update messages upon completion of the registration to the multicast group.

7. The method of claim 1, wherein the requested location server is added to the replicated multicast group according to the following steps of:
    detecting an occurrence of a rebooting signal or a server addition signal in the replicated multicast group; and
    identifying a location server associated with the detected rebooting signal or the server addition signal as the requested location server.

8. The method of claim 1,
    wherein the requested location server requests the service server for a registration to be an anycast group in response to receipt of a completion of the dumping is completed, the anycast group is configured to directly receive the status update message from the service server and
    to transfer the directly received status update message to the location server of the replicated multicast group in response to completion of the registration.

9. The method of claim 1, wherein the replicated multicast group generates information associated with a user location information or information of a user's simultaneous access in conjunction with the receipt of the status update message, and notifies the service server of the generated information.

10. The method of claim 1, wherein dumping message is requested when a threshold time elapses upon completion of the registration to the multicast group.

11. The method of claim 1, further comprising:
    counting a number of transferring times of the status update messages subsequent to completion of the registration to the multicast group,
    wherein the requested location server requests one of the multicast servers for dumping the message if the counted number is equal to or greater than a threshold value.

12. A non-transitory computer-readable record medium comprising an executable program, which when executed, performs a method, the method comprising:
    receiving a request of initializing a location server to register the requested location server to one of multicast servers of a replicated multicast group, wherein a plurality of multicast servers are replicated in a network;
    transferring a set of status update messages associated with one of the multicast servers to the requested location server in response to detection of a completion of a registration by one of the multicast servers, wherein the set of status update messages are transmitted from a service server to one of the multicast servers using an anycast;
    requesting the requested location server for receiving dumping message; and
    dumping, in responding to the request, the set of status update messages of one of the multicast servers to the requested location server, wherein said dumping comprises determining whether a firstly requested location server has received each status update message at a time when the dumping message is requested, and dumping another set of status update messages to the secondly requested location server, wherein the another set of status update messages is determined based on a time stamp of each status update message and the time stamp is determined when the firstly requested location server transfers set of status update messages.

13. A system for initializing a server for a replication group comprising a plurality of servers configured to communicate using a multicast, the system comprising:
    a multicast request generation unit coupled to a processor to generate a request of initializing a location server to register the requested server to one of multicast servers of a replicated multicast group, wherein a plurality of multicast servers are replicated in a network;
    upon receipt of the request, the processor to transfer status update messages which are received from a service server to the requested location server using an anycast in response to detection of a completion of the registration,
    wherein status update messages which are stored in a message pool of one of the multicast servers are transferred to the requested location server according to a message dump process for dumping, and wherein said dumping comprises determining whether a firstly requested location server has received each status update message at a time when a dumping message is requested, and dumping another set of status update messages to a secondly requested location server, wherein the another set of status update messages is determined based on a time stamp of each status update message and the time stamp is determined when the firstly requested location server transfers set of status update messages.

14. The system of claim 13, further comprising: the dump request unit to request the message dump if a threshold time elapses subsequent to the requested location server is registered to the replicated multicast group.

15. The system of claim 13, further comprising:
    a message count unit to count a number of times of transferring of the status update messages subsequent completion of the registration to the multicast group, wherein the dump request unit requests the message dump if the counted number of times a threshold number of times.

16. The system of claim 13, further comprising:
    a duplicate message removing unit to remove duplicate dumped status update messages in the requested location server in response to completion of dumping of the status update messages.

17. The system of claim 16, wherein the duplicate message removing unit removes status update messages received from the service server in response to detection of registration of the requested location server to the replicated multicast group.

18. A computer system for initializing a location server, the system comprising:
    a replicated multicast group comprising a plurality of location servers configured to communicate using a multicast, each of the plurality of servers being maintained with information associated with users and a multicast list;
    a computing device configured to:
        identify a location server being added to the replicated multicast group;
        upon identification, request a first location server to register a second location server to the multicast list;
        transfer a first set of status update messages to the second location server in response to detection of completion of the registration by the first location server, wherein the first set of status update messages is received from a service server using an anycast; and
        to request the first location server to dump a message, wherein the first location server dumps a second set of status update messages to the second location server according to a message dumping process, the second set of status update messages being maintained in the first location server, wherein said dumping comprises determining whether the first location server has received each status update message at a time when the message dump is requested, and dumping another set of status update messages to the second location server, wherein the another set of status update messages is determined based on a time stamp of each status update message and the time stamp is determined when the first location server transfers the first set of status update messages.

19. The computer system of claim 18, wherein the computing device to identify the second location server that is added to the replicated multicast group in response to detection of a rebooting signal or a server addition signal associated with the replicated multicast group.

* * * * *